(12) United States Patent
Veluswamy et al.

(10) Patent No.: US 11,288,141 B2
(45) Date of Patent: Mar. 29, 2022

(54) AI-BASED ONLINE RECOVERY OF NON-CRITICAL BUSINESS PROCESS DATA WITH REFERENTIAL INTEGRITY

(71) Applicant: EMC IP Holding Company LLC, Hopkinton, MA (US)

(72) Inventors: Pratheek Veluswamy, Bangalore (IN); Shibi Panikkar, Bangalore (IN); Sekar Ponnayan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 186 days.

(21) Appl. No.: 16/718,363

(22) Filed: Dec. 18, 2019

(65) Prior Publication Data

US 2021/0191824 A1 Jun. 24, 2021

(51) Int. Cl.
*G06F 7/00* (2006.01)
*G06F 11/14* (2006.01)
*G06F 16/23* (2019.01)
*G06N 20/00* (2019.01)

(52) U.S. Cl.
CPC ...... *G06F 11/1469* (2013.01); *G06F 11/1464* (2013.01); *G06F 16/2365* (2019.01); *G06N 20/00* (2019.01); *G06F 2201/82* (2013.01)

(58) Field of Classification Search
CPC ............. G06F 11/1469; G06F 16/2365; G06F 11/1464; G06F 2201/82; G06N 20/00
USPC .................................................. 707/600–899
See application file for complete search history.

(56) References Cited

U.S. PATENT DOCUMENTS

2009/0228525 A1* 9/2009 Fridrich ................. G06Q 10/10

\* cited by examiner

*Primary Examiner* — Isaac M Woo
(74) *Attorney, Agent, or Firm* — Krishnendu Gupta; Deepika Bhayana; Dorothy Wu Chiang

(57) ABSTRACT

A machine learning (ML) module that intelligently stores data in an online backup system based on the criticality of a business process. For a critical business process, all pre- and post-operation data are stored in the backup. For a non-critical business process, the ML module does not collect all data, but collects that data which deviates from a pre-defined target data pattern. Such deviating data is stored for a given time period and then discarded if no recovery request is received for it within the time period. Subsequent receipt of similar type of data may trigger the ML module to not store it. Thus, online backup storage is maintained at a manageable size without any loss of data for a critical business process. During data recovery, data is retrieved from the online backup with referential integrity to restore the original database without downtime to give a truly online recovery experience.

17 Claims, 5 Drawing Sheets

String Parameters          504                              500

| Pattern Derived 502 | Data collection criteria on new insert or update |
|---|---|
| Length range | Out of the range |
| Specific unique value(s) | Out of the unique value(s) |
| Number of words | String with less or more number of words |
| Encrypted | Not encrypted |
| Specific group of servers | Server names not from the specific group |
| Special characters included | Non-special characters |
| No special character | With special character |
| Name (when using Named Entity Recognition model) | If it is not a name |
| Frequency of data repetition | Out of frequency |

FIG. 5

Number Column          604                              600

| Pattern Derived 602 | Data collection criteria on new insert or update |
|---|---|
| A specific sequence | Out of sequence |
| Length range | If outside the range |

FIG. 6

Date Column

| Pattern Derived 702 | Data collection criteria on new insert or update 704 |
|---|---|
| Before SysDate | After SysDate |
| After SysDate | Before SysDate |
| Specific range | Out of range |
| Format | Out of format |

FIG. 7

Source/User Column

| Pattern Derived 802 | Data collection criteria on new insert or update 804 |
|---|---|
| List of users | New user |
| Time range of user updates | Out of the time range |
| List of data updates by specific user | User updates different data |
| Delete only at specific time | Out of time range delete |
| Never deleted a specific transaction | Deletion of specific transaction |

FIG. 8

Generic

| Pattern Derived 902 | Data collection criteria on new insert or update 904 |
|---|---|
| Time range for bulk inserts or updates | Out of time range |
| No updates so far for a col. | Update comes for that column |
| LOB contains only images | Data with text |
| Format | Out of format |
| Delete time range | Out of time range |
| Never deleted | Delete request |

FIG. 9

AI-BASED ONLINE RECOVERY OF NON-CRITICAL BUSINESS PROCESS DATA WITH REFERENTIAL INTEGRITY

TECHNICAL FIELD

This disclosure relates generally to database recovery tools and, more particularly, to an Artificial Intelligence (AI) based database recovery methodology in which data for a non-critical business process can be recovered online with referential integrity and without downtime.

BACKGROUND

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, network storage devices, and the like. These devices or systems may vary in size, shape, performance, functionality, and price. In any event, almost all of these modern devices are equipped with relevant hardware and software to allow their users to access a number of different websites over the Internet and perform online transactions.

Data for online transactions may be stored using information handling systems such as, for example, network storage devices or databases, which may be structured or unstructured. In the current industry, many recovery tools are available for popular online databases. These tools operate on a snapshot-based data recovery approach in which the backup data represents periodically-taken snapshots of the contents of the original database. In that regard, the recovery tools may depend on data blocks, backup tapes (which may be used for off-line storage of data), and the like, based on the database archiving model. If there is any data loss or corruption, the currently-available recovery tools may replace the entire block of data or a particular data segment or an entire file. However, if a physical tape (containing backup data) is corrupted, there may be no option to do the recovery.

SUMMARY

This Summary provides a simplified form of concepts that are further described below in the Detailed Description. This Summary is not intended to identify key or essential features and should therefore not be used for determining or limiting the scope of the claimed subject matter.

In the context of online recovery of data stored in an information handling system such as, for example, an online database or network storage device, the present disclosure relates to using an AI-based machine learning (ML) module that intelligently stores data in a backup system based on the criticality of a business process for which the backup is to be performed. For a database operation associated with a critical business process, all pre- and post-operation data may be collected and stored in the backup system. However, for an operation associated with a non-critical business process, the ML module may not collect all pre- and post-operation data for online backup, but rather may collect the operation-specific data when the module finds that the data deviates from a pre-defined target data pattern identified in the original/source database. Such data may be initially considered as suspect (e.g., "fishy") data. "Suspect data" refers to data that may not be trustworthy such as, for example, the data that is not conforming to (or deviating from) a pre-defined target pattern. The collected ("fishy" or non-conforming) data may be stored in the backup system for a pre-determined time period (for example, one month), during which the ML module also may store related post-operation data. If no recovery request is received from a user for such suspect data within the pre-determined time period, the stored data (including the collected data and associated post-operation data) may be discarded to avoid storing unnecessary data in the online backup system, especially when the business process is not considered as a critical business process. Furthermore, subsequent receipt of similar type of data may trigger the ML module to mark it as "non-suspect" and not store/collect it.

In one embodiment, the present disclosure is directed to a method, which comprises: (i) receiving, by a computing system, an indication that a business process is a non-critical business process; (ii) determining, by the computing system, that a database entry for an operation associated with the business process deviates from a pre-defined target pattern; (iii) storing, by the computing system, the database entry for a pre-determined time period; and (iv) discarding, by the computing system, the stored database entry in the absence of a recovery request for the operation within the pre-determined time period. For backup and recovery, the database entry may be stored in a backup storage different from a database in which the entry was originally stored. The database entry may include one or more of the following: (i) date and time of the operation; (ii) an identification of a transaction associated with the operation; (iii) an identification of an originator of the transaction (which may be a human user or a different source); and (iv) data associated with the transaction.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive an indication that a business process is a non-critical business process; (ii) determine that a database entry for an operation associated with the business process deviates from a pre-defined target pattern; (iii) store the database entry for a pre-determined time period; and (iv) discard the stored database entry in the absence of a recovery request for the operation within the pre-determined time period.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (i) receiving an indication that a business process is a non-critical business process; (ii) determining that a database entry for an operation associated with the business process deviates from a pre-defined target pattern; (iii) storing the database entry for a pre-determined time period; and (iv) discarding the stored database entry in the absence of a recovery request for the operation within the pre-determined time period.

The ML module as per teachings of the present disclosure is an AI-based analytical tool that can continuously learn database storage patterns and relationships among various database table objects to instantly recognize a suspect database entry that deviates from a pre-defined target data pattern. In the context of a non-critical business process, this ability enables the ML module to monitor such suspect data for a given time period and discard it from the backup storage if a user does not request recovery of the related transaction within the time period. For a critical business process, however, the backup storage may be carried out without any restrictions. In this manner, online backup storage may be maintained at a manageable size without any loss of data for a critical business process. As a result, data may be retrieved reasonably promptly and with referential integrity from the online backup to restore the original database in the event of data corruption or incorrect data entry. Thus, data recovery may be performed without downtime to give a truly online recovery experience.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIG. 5 is an exemplary table showing a set of pre-defined target data patterns and corresponding data collection criteria for string parameters stored in the database tables in the source database of FIG. 1 as per certain embodiments of the present disclosure.

FIG. 6 is an exemplary table showing a set of pre-defined target patterns and corresponding data collection criteria for the columns containing numbers in the database tables in the source database of FIG. 1 as per some embodiments of the present disclosure.

FIG. 7 is an exemplary table showing a set of pre-defined target patterns and corresponding data collection criteria for the columns containing dates in the database tables in the source database of FIG. 1 as per particular embodiments of the present disclosure.

FIG. 8 is an exemplary table showing a set of pre-defined target patterns and corresponding data collection criteria for the columns containing user or source information in the database tables in the source database of FIG. 1 as per certain embodiments of the present disclosure.

FIG. 9 is an exemplary table showing a set of pre-defined target patterns and corresponding data collection criteria for the columns containing generic parameters in the database tables in the source database of FIG. 1 as per some embodiments of the present disclosure.

DETAILED DESCRIPTION

Figure 1:
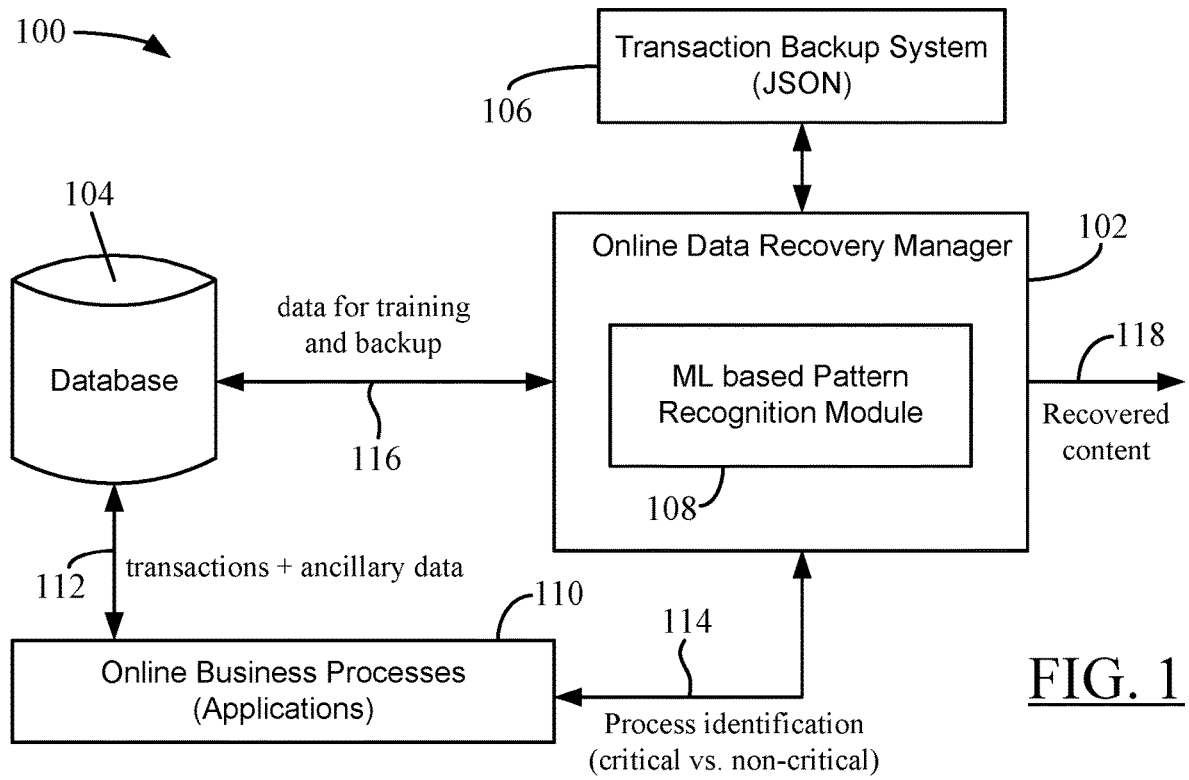
FIG. 1 shows an exemplary block diagram showing how online data recovery as per particular embodiments of the present disclosure may be implemented.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device (or database), a network controller, or any other suitable device, and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "pre-defined", "computer-readable", "AI-based", etc.) may be occasionally interchangeably used with its non-hyphenated version (e.g., "predefined," "computer readable", "AI based", etc.), and a capitalized entry (e.g., "Business Process", "Backup System," "Pattern Recognition Module", etc.) may be interchangeably used with its non-capitalized version (e.g., "business process," "backup system," "pattern recognition module", etc.). Such occasional interchangeable uses shall not be considered inconsistent with each other.

As mentioned before, data for online transactions may be stored using information handling systems such as, for example, network storage devices or online databases, which may be structured or unstructured. As also noted before, the currently-available data recovery tools may deploy a snapshot-based data recovery approach in which an entire block of data or a particular data segment or an entire file may be replaced in the event of any data loss or corruption. In other words, the current recovery process does not explore which specific business transaction is lost or corrupted. As a result, the recovery attempt becomes a huge and time-consuming endeavor in which many other associated transactions (which may not have been corrupted at all) have to be stopped and the database (for which recovery is attempted) may have to be taken off-line to restore the data. The downtime needed to successfully restore the data may create huge business impact and financial loss. Furthermore, the other correct transactions that happened at the same time as the erroneous transaction may be lost in the recovery attempt. Additionally, if a physical tape (containing backup data) is corrupted, there may be no option to do the recovery.

One solution to the above problem may be to collect all Structured Query Language (SQL) or other Data Manipulation Language (DML) operations from the source system/database and record (in the backup system) all pre- and post-operation data for each such operation. When a user requests to recover data based on any wrong operation(s) or any other data corruption, the backup system may access the pre- and post-operation data from this collection and restore back the content in the source database based on the time period (or duration) of erroneous transaction(s) reported by the user. However, a problem with this approach is that when all the pre- and post-operation data are collected, the size of the data stored in the backup system may become huge to manage in an efficient manner. During recovery, it may become difficult to retrieve the data from this huge storage to offer a truly online recovery experience to the user.

It is therefore desirable to devise a methodology of online data recovery that does not rely on indiscriminate collection of all database objects for all business operations or processes. In that regard, it is desirable that the online recovery methodology captures data for only those processes for which a business is interested in having an online recovery, as opposed to the already-available option of having an offline data recovery with downtime.

The present disclosure relates to online data recovery based on machine learning (ML) techniques. In one embodiment, an AI-based ML module intelligently stores data in a backup system based on the criticality of a business process for which the backup is to be performed. A business process that is a candidate for online recovery may be designated as either a critical business process or a non-critical (or "regular" or "normal") business process. For a critical business process, all pre- and post-operation data may be collected and stored in the backup system. However, for an operation associated with a non-critical business process, the ML module may not collect all pre- and post-operation data for online backup, but rather may collect the operation-specific data when the module finds that the data deviates from a pre-defined target data pattern identified in the source database. Such data may be initially considered as earlier-mentioned "suspect data". The collected suspect data may be stored in the backup system for a pre-determined time period (for example, one month), during which the ML module also may store related post-operation data in certain embodiments. If no recovery request is received from a user for such suspect data within the pre-determined time period, in some embodiments, the stored data (including the collected data and associated post-operation data) may be discarded to avoid storing unnecessary data in the online backup system, especially when the business process is not considered as a critical business process. Furthermore, subsequent receipt of similar type of data may trigger the ML module to mark it as "non-suspect" and not store/collect it, thereby maintaining the online backup storage at a manageable size without any loss of data for a critical business process. As a result, data may be retrieved reasonably promptly and with referential integrity from the online backup to restore the original database in the event of data corruption or incorrect data entry. Thus, data recovery may be performed without downtime to give a truly online recovery experience.

FIG. 1 shows an exemplary block diagram 100 showing how online data recovery as per particular embodiments of the present disclosure may be implemented. In the context of FIG. 1, an online data recovery manager (or, simply, "recovery manager" or "recovery tool") 102 is shown to be in communication with a database 104, which is to be monitored (by the recovery manager 102) for backup. The recovery manager 102 may backup relevant content of the database 104 in a transaction backup system (or backup storage) 106 based on the type of the business process (critical vs. non-critical), as explained later. The database 104 may be occasionally referred to as a "source database" or an "original database" to distinguish it from the backup storage 106. In particular embodiments, the data recovery manager 102 may be an AI-based software application comprising program code, which, upon execution by a processor in an information handling system (such as the processor 1102 in the computer system 1100 in FIG. 11) may cause the information handling system to perform various operational tasks discussed below with reference to FIGS. 2-10. The information handling system may be owned or operated by a corporate entity or an online business unit of the corporate entity desirous of deploying the data recovery manager 102 for online data backup and recovery for the database 104 as per teachings of the present disclosure. As shown in FIG. 1, the recovery manager 102 may comprise an ML-based component module—a pattern recognition module (or, simply, "PR module") 108. The functionality of the PR module 108 is discussed below with reference to FIGS. 3-9.

The recovery tool 102 may be configured to operate on the database 104 regardless of whether the database 104 is a structured database or an unstructured database. In one embodiment, the database 104 may be implemented online (such as, for example, a cloud storage or an Internet-based networked storage) to store digital content using a relational model of data organization. Various software systems used to maintain or manage such relational databases are known as a Relational Database Management System (RDBMS). Thus, an RDBMS (or, more simply, a DBMS) is a software tool for database development, administration, and management. Virtually all modern relational database systems use a Data Manipulation Language (DML), such as a Structured Query Language (SQL), as the language for querying and maintaining a database (DB), such as the database 104. Some examples of an RDBMS include an Oracle® server, a Microsoft® SQL server, a MySQL (open source) system, an IBM® DB2 system, and so on. In particular embodiments, the database 104 may receive digital content (or database entries) generated by, related to, or associated with online business processes or applications, collectively (as well as individually) identified using the reference numeral "110" in FIG. 1. Such content may include, for example, business transactions and ancillary data reported (to the database 104) through one or more operations (such as a DML or SQL operations) associated with a business process, as indicated by arrow 112 in FIG. 1. Thus, in particular embodiments, a database entry (or, simply, a "data entry") received from or associated with an online business process 110 may include some or all of the following content: (i) the date and time of the (SQL) operation, (ii) an identification of the commercial transaction (for example, an online product order number, an online payment reference, and the like) associated with the operation, (iii) an identification of an originator of the transaction (for example, a user ID of a human user or an ID of other source of the transaction), and (iv) the data associated with the transaction (such as, for example, the name of the product purchased, the amount of payment, and so on). In certain embodiments, a database entry may comprise additional or different content based on the implementation of the database 104. Prior to backup, the database entries may be initially stored in the database 104.

It is noted that, in certain embodiments, the database 104 and the backup system 106 may be provided using two separate information handling systems (not shown). Furthermore, the backup system 106 itself also may be a data storage system (or a database) that is coupled to or in communication with the data recovery manager 102 to receive the relevant content of the database 104 selected by the recovery manager 102 (as discussed later below) for backup storage. In one embodiment, the content selected for backup may be stored in the backup system 106 in a JavaScript Object Notation (JSON) format. In some embodiments, either or both of the data storages 104, 106 may include multiple databases operating in a distributed storage environment. It is further noted that the business processes or applications 110 may be running on, hosted by, or provided by an information handling system (not shown) that is different from or the same as the system (not shown) deploying the recovery manager 102. All different information handling systems related to the configuration 100 in FIG. 1 may be networked or communicatively connected to one another as required to implement the online recovery as per teachings of the present disclosure. In some embodiments, such connections may be through the Internet or may use a combination of a corporate intranet and the Internet. The architectural details of interconnections among various entities shown in FIG. 1, hardware configurations of each such entity, or the network topology of communication among these entities are not relevant to the present disclosure and, hence, such details are not shown in FIG. 1 and additional discussion thereof is not provided here for the sake of brevity.

In some embodiments, a business entity may have an application development team that develops and supports the business applications 110 needed to carry out online business transactions on behalf of the business entity. The business entity also may have a database team that handles the storage and recovery of the data (or other digital content) generated by or associated with the business processes 110. In particular embodiments, a human user (or multiple users) in the application development team may classify (or identify) a business process as a "critical" or "non-critical" business process depending on the business need for online backup and recovery. It is observed here that the business entity already may have off-line backup and data recovery in place for all business processes, with attendant downtime. However, the business management or the application development team may be interested in also having an online recovery option available for certain business processes. In that event, in some embodiments, a human user (for example, from the business management or the application development team) may manually register with the recovery manager 102 each such business process for which the user wishes to have online recovery available, as indicated by arrow 114 in FIG. 1. At the time of registering the business process, the user also may manually identify whether the process is classified as a "critical" business process or a "non-critical" (interchangeably also referred to as "regular" or "normal") business process. For example, if the business entity is an online vendor of different electronic products, the online "Product Order Booking" process may be classified as a "normal" or "non-critical" business process, whereas the online "Payment from Customer" or "Payment Received" process may be classified as a "critical" business process. Other online business processes may be similarly classified based on security/priority of financial data and other business considerations. The data associated with each critical or non-critical business process may be stored in the database 104 in the form of multiple database table objects with specific relationships among the database objects.

Generally, during data recovery, only those data which are corrupted or entered incorrectly are typically requested from the backup. For online recovery, the online data backup (such as the backup system 106) may need to be maintained at a manageable size to efficiently retrieve and restore the desired data for a truly online recovery experience. Therefore, as noted before, it may not be desirable to indiscriminately backup all pre- and post-operation data for each online business process. As discussed in more detail later, the recovery manager 102 selectively collects/retrieves data from the database 104 and backs up the collected data in the backup system 106 based on the type/classification of the business process (critical vs. non-critical). For a critical business process, all pre- and post-operation data may be collected and stored in the backup system 106. However, for a non-critical business process, those operation-specific data which deviate from relevant pre-defined data patterns (identified in the source database 104) may be collected and stored in the backup system 106 for a pre-determined time period (for example, one month). In certain embodiments, the post-operation data related to such suspect data also may be stored in the backup system 106 during the pre-determined time period. If no recovery is requested for the suspect data within the pre-determined time period, the collected suspect data and associated post-operation data may be discarded to avoid storing unnecessary data in the online backup system 106.

As shown in FIG. 1, in one embodiment, the ML-based data recovery manager 102 (more specifically, the ML-based PR module 108) may be trained, for example, using primarily non-critical process-specific historical data from the database 104. In certain embodiments, in case of a critical business process, such training may not be necessary because of the collection of all pre- and post-operation data. However, in case of a non-critical business process, the PR module 108 may need to be trained to distinguish "suspect" or "fishy" data to enable the recovery manager 102 to initiate collection of such data as per teachings of the present disclosure. In one embodiment, for a non-critical business process, the PR module 108 may communicate with the database 104 to receive historical data from the database 104 associated with the non-critical business process under consideration, as indicated by arrow 116 in FIG. 1. The historical data may have been stored in the database 104 and may include content related to a plurality of past business transactions associated with the (non-critical) business process before the recovery manager 102 is engaged to backup data related to a current SQL/DML operation. For example, in case of the earlier-mentioned "Product Order Booking" process, the historical data may contain information such as, for example, details of product orders, product name, date and time when the orders were placed, transaction IDs of the orders, UserIDs of the website users placing the orders or ServerIDs of specific group of servers transmitting the orders, and the like. Because such data may have been typically stored as database table objects in the database 104 with pre-defined data patterns and pre-defined relationships among the data objects, the training may enable the PR module 108 to learn and recognize the set of data patterns present in the historical data content and relationships among the data patterns. This training process may be repeated for each non-critical business process identified at arrow 114. In particular embodiments, the training of the PR module 108 may be continuous or on-going. The training of various ML-based classifiers and analytical tools in the PR module 108 may generate a trained version of the data recovery manager 102. In particular embodiments, the trained version of the recovery manager 102 may be deployed to determine if any current database entry for an operation associated with a regular (non-critical) business process deviates from a pre-defined target pattern (which is a part of the set of data patterns learned by the PR module 108 during the training phase), as discussed in more detail later. However, for ease of discussion, the qualifier "trained" may be omitted when providing details of pattern recognition and selective online backup (for a normal business process) by the recovery manager 102 as per teachings of the present disclosure. In other words, the reference numeral "102" also may refer to the trained version of the recovery tool as per teachings of the present disclosure, as may be evident from the context of discussion.

At run time, the data recovery tool 102 may monitor the content of the database 104, store the relevant content (based on the type of the business process, as discussed before) in the backup system 106, and provide data recovery in the event of data corruption or incorrect data entries. When an authorized person at the business entity requests recovery of certain data based on, for example, a specific time or time range of transactions, a specific transaction, a specific operator/user, and the like, the recovery manager 118 may access the backup system 106 and provide the recovered content online, as indicated at arrow 118. In certain embodiments, the recovery manager 118 also may restore the database 104 online with the recovered content.

Figure 2:
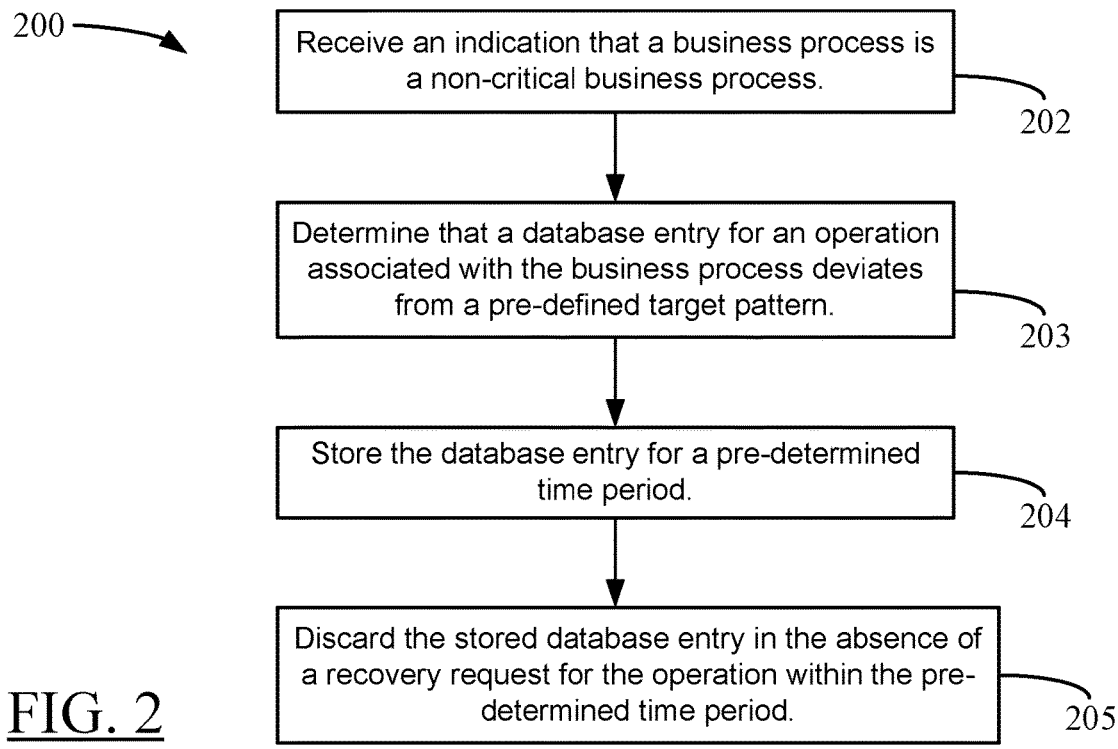
FIG. 2 is an exemplary flowchart depicting various steps that may be performed by a computing system as per particular embodiments of the present disclosure to carry out online recovery using the data recovery manager of FIG. 1.

FIG. 2 is an exemplary flowchart 200 depicting various steps that may be performed by a computing system as per particular embodiments of the present disclosure to carry out online recovery using the data recovery manager 102 of FIG. 1. In one embodiment, the computing system may be the system 1100 shown in FIG. 11 and discussed later below. More generally, the computing system performing the steps shown in FIG. 2 may include in hardware and/or software the functionality of the recovery tool 102. In one embodiment, the program code for the recovery tool 102 (and other relevant program code such as the program code for an operating system managing the execution of the tool 102) may be executed by a processor (such as the processor 1102 in FIG. 11) in the computing system, and, upon execution of the program code, the computing system may be operative to perform the tasks illustrated in FIG. 2.

In the flowchart 200, each block represents one or more tasks that can be implemented in hardware, software, or a combination thereof. In the context of software, the blocks represent computer-executable instructions that, when executed by one or more processors in a computing environment, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the process shown in the flowchart 200. For discussion purpose, the process in the flowchart 200 is described with reference to FIG. 1 as described above, although other models, frameworks, systems and environments may be used to implement this process.

Initially, as noted at block 202, the computing system (for example, the computer system 1100 in FIG. 11) may receive an indication (such as the notification at arrow 114 in FIG. 1) that a business process (for example, the earlier-mentioned online product order booking process) is a non-critical or regular business process. As noted earlier, the indication at block 202 may be received from a human user who may manually input the process identification into the computing system or may electronically transfer the relevant information (for example, from a different source) into the computing system. In some embodiments, the received classification of various business processes may be stored in a memory (such as the memory 1104) of the computing system. As noted at block 203, the computing system may determine that a database entry for an operation (for example, an SQL operation) associated with the business process deviates from a pre-defined target pattern. In some embodiments, the computing system may use the trained version of the recovery manager 102 (more specifically, the trained version of the ML-based PR module 108) to perform the task at block 203. It is understood that the business process may use one or more SQL operations (or other DML operations) on the database 104 to store therein one or more database entries (such as transaction data and other ancillary data, information, or digital content) generated as part of one or more online transactions during an online session (for example, a product purchase session) involving the business process. As part of the routine backup of the database 104, the computing system may access the database 104, identify recent SQL operations, retrieve corresponding database entries, and determine any suspect data entries that deviate from corresponding pre-defined target patterns, some examples of which are provided in FIGS. 5-9 (discussed later). Thereafter, as noted at block 204, the computing system may store the deviating database entry (in the backup system 106) for a pre-determined time period (for example, one month). The computing system may discard the stored database entry in the absence of a recovery request for the operation (discussed earlier with reference to block 203) within the pre-determined time period, as noted at block 205. In this manner, the computing system may perform selective online storage and removal of backup data for non-critical business processes, thereby maintaining the size of the data stored in the backup storage 106 to a manageable level to facilitate efficient online data recovery when needed.

Figure 3:
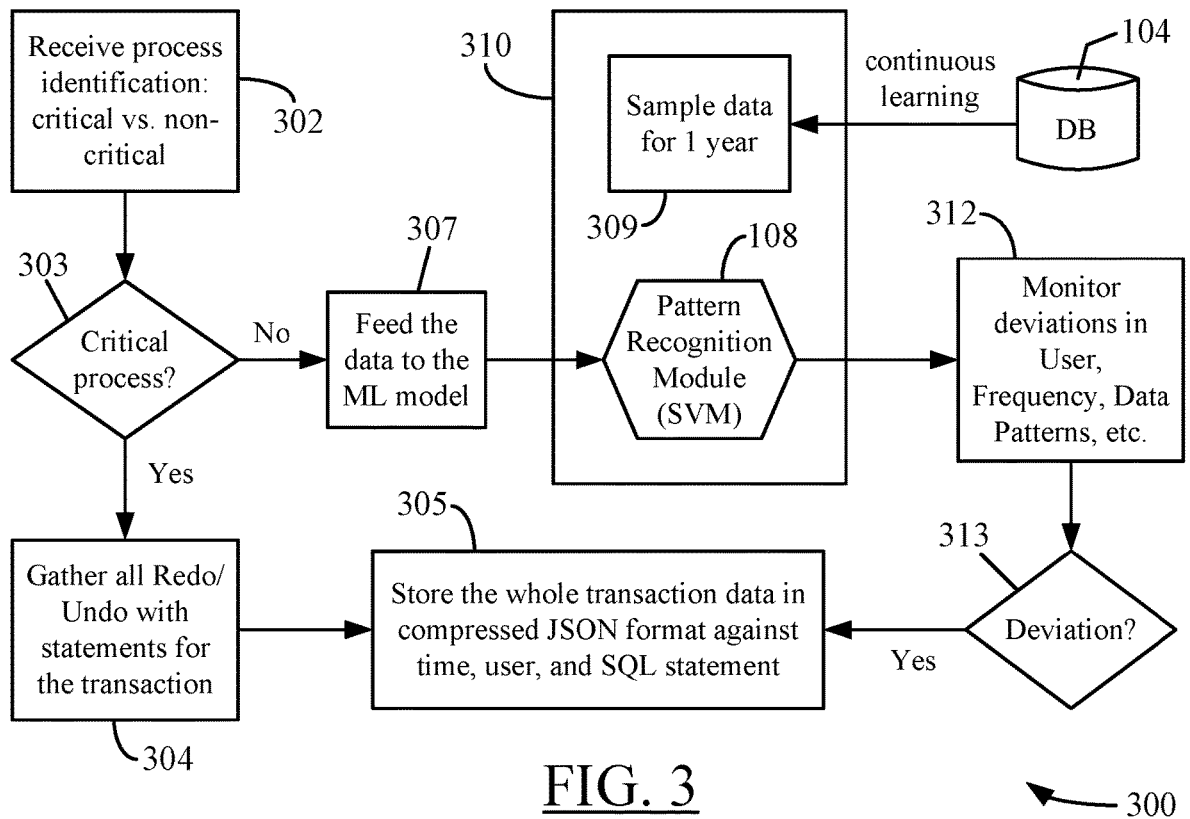
FIG. 3 is a flowchart providing an overview of various tasks that may be performed by the recovery manager of FIG. 1 as per certain embodiments of the present disclosure.

FIG. 3 is a flowchart 300 providing an overview of various tasks that may be performed by the recovery manager 102 of FIG. 1 as per certain embodiments of the present disclosure. As noted before, the classification of a business process 110 may determine what process-specific data content is collected by the recovery manager 102 for backup. Thus, initially at block 302, the recovery manager 102 may receive information identifying an online business process 110 as a critical process or a non-critical process (also shown by arrow 114 in FIG. 1). If the recovery manager 102 determines that the business process 110 is designated as a critical process (block 303), the recovery manager 102 may gather content of all Redo and Undo actions from the online database 104 along with related operation(s) (and associated data) for each online transaction carried out by the critical business process (block 304). In particular embodiments, at least a portion of this content may be generally considered as comprising the earlier-mentioned "database entry". It is noted here that, in the context of database management, a "transaction" may comprise a collection of SQL (or other DML) operations/statements treated as a logical unit. Undo actions and related SQL/DML statements/operations may be stored in the database 104 to provide the "before values" of changed data blocks whenever an insert, update, or delete operation is issued on the database 104. On the other hand, Redo actions may record the work that has been done, so that the work is not lost. The content collected at block 304 may comprise the whole transaction data for a transaction (or a set of transactions) associated with the critical business process. In one embodiment, the recovery manager 102 may store the online data content collected at block 304 in the backup storage 106 using the compressed JSON format, as noted at block 305 and illustrated in FIG. 5 (discussed later). In another embodiment, Oracle® compressed data format may be used instead. The content may be stored in the backup storage 106 against parameters such as, for example, time of the transaction, user/source of the transaction, and the SQL statement(s) associated with the transaction. Thus, for a critical business process, the recovery tool 102 may collect all SQL/DML statements with related pre- and post-operation data for backup.

On the other hand, if the recovery manager 102 determines that the business process 110 is designated as a regular or non-critical process (block 303), the recovery manager 102 may feed the database entry/entries for operation(s) associated with the non-critical business process to an ML model (here, the PR module 108 in FIG. 1), as noted at block 307. In certain embodiments, the ML-based PR module 108 may be trained using the relevant historical data from the database 104, as discussed earlier with reference to FIG. 1. In the embodiment of FIG. 3, the PR module 108 may be trained by sampling the historical data of past one (1) year, as indicated at block 309. This training may be a continuous learning operation in the sense that the PR module 108 may sample and learn on an ongoing basis from the most-recent set of 1-year of historical data. In one embodiment, the PR module 108 may use a neural network-based Support Vector Machine (SVM) classifier to analyze the data received at block 307 to monitor any deviations therein. The block 310 in FIG. 3 symbolically represents the training of the PR module 108 and generation of the trained version of the recovery tool 102. In particular embodiments, the training period may be programmable/adjustable by a user and may be different from the one year exemplary training period mentioned in FIG. 3.

As indicated at block 307 and as noted above, for a regular business process, the SQL/DML statements and associated data may be passed to the predictive model—here, the PR module 108. As noted at block 312, the trained version of the PR module 108 may analyze the SQL (or DML) statements and data to monitor any deviations in the user/source of the related transaction, in the frequency of repetition of a transaction or data over a given time period, in the pattern of data received (at block 307), and so on. Such deviations may be confirmed when the received data entries (at block 307) are measured against corresponding pre-defined target patterns in the training data for the PR module 108 (that is, the historical data for the same business process). If the PR module 108 finds any deviation (block 313) in the analyzed data entry, the recovery tool 102 may consider such a data entry as containing suspect data and may initiate storage of such "suspect" (or abnormal) data into the backup system 106 in the aforementioned compressed JSON format, as noted at block 305. The collected suspect data may be stored in the backup system 106 for a pre-determined time period (for example, one month). This time period may be programmable or adjustable by a user and, in some embodiments, the pre-determined time period may be more or less than the exemplary one month mentioned here. In particular embodiments, the PR module 108 also may store related post-operation data in the backup storage 106 during the pre-determined time period. In other embodiments, the post-operation data may be independently analyzed and stored (for their corresponding one month period) only if they qualify under the deviation requirement at block 313. If no recovery request is received from a user for the original suspect data within the pre-determined time period, the recovery tool 102 may treat the data pattern of the analyzed (suspect) data entry as "equivalent" to the corresponding pre-defined target pattern (from which the database entry was initially found to be deviating). In that case, the recovery manager 102 may instruct the backup system 106 to discard the stored data (including the collected "fishy" data and any associated post-operation data, if also stored) to avoid storing unnecessary data in the online backup system 106, especially when the business process is not considered as a critical business process. Furthermore, in certain embodiments, after the conclusion of the pre-determined time period, the recovery manager 102 may discontinue backup storage of those database entries that contain data patterns similar to the suspect data pattern. In other words, subsequent receipt of similar type of data may trigger the PR module 108 to mark them as "non-suspect" and not store/collect them, thereby maintaining the online backup storage at a manageable size without any loss of data for a critical business process. On the other hand, if there is any missed data collection and a user asks the recovery manager 102 for the recovery of such data, the recovery manager 102 may start collecting the data pattern of such missed data the next time it receives such data pattern.

It is observed here that if a second database entry is also found deviating from its corresponding pre-defined target pattern (block 313 in FIG. 3), the second (suspect) database entry also may be sent to the backup system 106 to be stored for the pre-determined time period. However, if a recovery request, for example, for a data revert for the respective SQL/DML operation (or at least a portion of the relevant transaction), is received by the recovery manager 102 within the pre-determined time period (that is, while the second suspect database entry is still stored in the backup system 106), the recovery manager 102 may perform the requested data recovery from the backup storage 106 to the original/source database 104 based on the corresponding suspect data stored in the backup storage 106 prior to the occurrence of the SQL/DML operation associated with the recovery request. In certain embodiments, through the continuous training (or learning) process, the ML-based PR module 108 may identify/recognize the new data pattern of the second database entry for which a recovery request was received. Such a new data pattern may be different from the set of target data patterns earlier encountered by the PR module 108, and, consequently, in some embodiments, the recovery manager 102 may continue to store in the backup storage 106 those database entries that contain data patterns similar to the new data pattern of the second database entry. In some embodiments, such storage of additional database entries may continue beyond the pre-determined time period, possibly till the PR module 108 is fully trained with the new data pattern (and its relationship with other existing data patterns/strings) and starts discarding related database entries in the manner discussed before.

From the above discussion of FIG. 3, it is noted that, in particular embodiments, no such deviation-based monitoring may be performed for database entries associated with a critical business process. In other words, the recovery manager 102 may continue to store a database entry for an operation associated with a critical business process in the backup storage 106 beyond the earlier-mentioned pre-determined time period (for example, one month), regardless of whether the data entry deviates from any pre-defined target pattern. Thus, the size of the data in the online backup storage 106 may be maintained at a manageable level without any loss of data for a critical business process.

Figure 4:
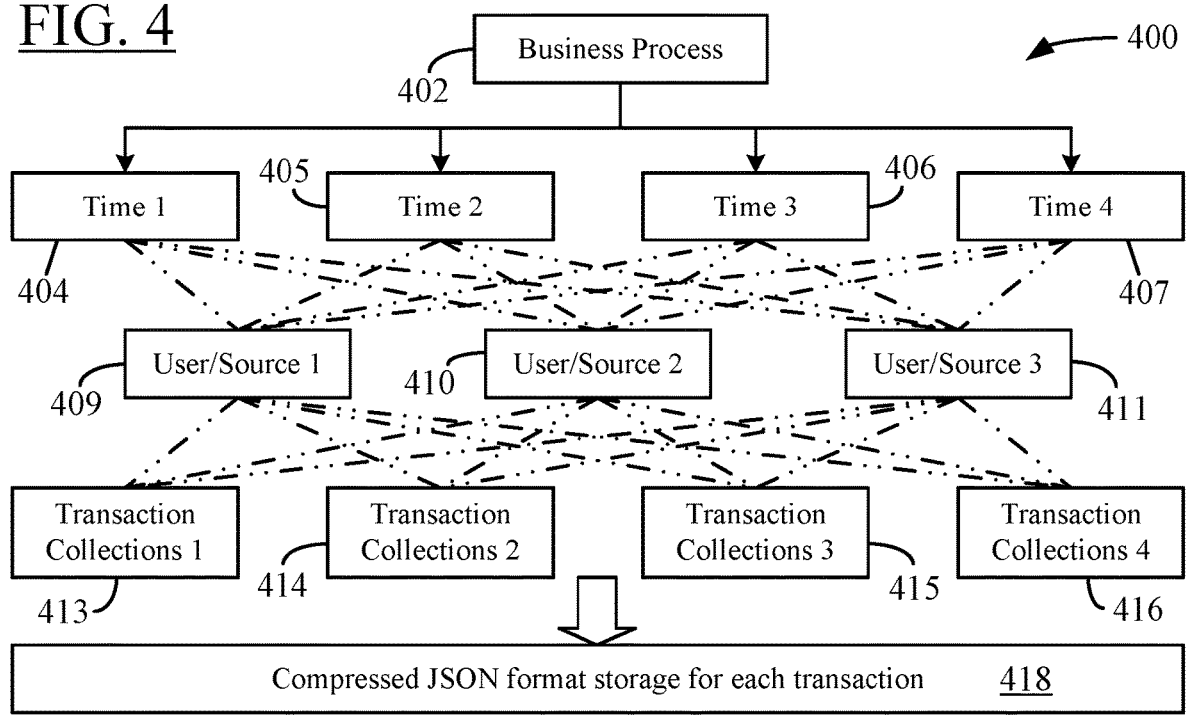
FIG. 4 is an exemplary illustration of different types of data that may be stored in the backup system of FIG. 1 as per particular embodiments of the present disclosure.

FIG. 4 is an exemplary illustration 400 of different types of data that may be stored in the backup system 106 of FIG. 1 as per particular embodiments of the present disclosure. For ease of illustration, the data collection is illustrated with reference to a single business process 402, with limited types of data (such as time values, user IDs, and transactions), and with a limited number of transactions. However, it is understood that the illustration 400 may continue on the timeline beyond what is shown in FIG. 4, and similar or different types of data may be collected for other business processes as well. The business process 402 may be an online business process 110 (FIG. 1) and may be a critical business process or a non-critical business process (for which data collection may be performed when deviation is found at block 313 in FIG. 3, as discussed before). In the illustration 400, the data is shown to be collected for the business process 402 during four different time instants (or time ranges, in some embodiments) 404-407 and from three different users or sources 409-411. In some embodiments, two or more of the sources 409-411 may represent the same human user or the same non-human source (such as a server, a device, a terminal, and the like). For each time instant 404-407, there may be a corresponding transaction 413-416 for which SQL statements and data may be collected and effectively stored in the backup system 106 for retrieval on demand. The data entries stored in the database 104 (and subsequently collected for backup) may include the time values 404-407, corresponding online transaction data 413-416, and information identifying the human user(s) or non-human source(s) 409-411 carrying out the online transactions (such as, for example, userIDs, server IDs, device identifiers, and the like).

As shown by various dotted lines in FIG. 4, each layer of data may be interrelated with the data from the layer(s) adjacent to it (below and/or above). In the context of FIG. 4, the dotted lines are used to illustrate the possibilities that each user may initiate each transaction at each time instant. However, in practice, the user actions may be limited. For example, the first user 409 may initiate the first online transaction 413 at the first time instant 404 and the second online transaction 414 at the second time instant 405, the second user 410 may initiate the first online transaction 413 at the first time instant 404 and the third online transaction 415 at the third time instant 406, and the third user 411 may initiate the fourth online transaction 416 at the fourth time instant 407. As indicated by reference numeral "418" and as mentioned before, in some embodiments, the process-specific transaction data and other ancillary data (such as, for example, the data at arrow 112 in FIG. 1) may be stored in the online backup system 106 using the compressed JSON format. In case of the embodiment in FIG. 4, the data stored at block 418 may include the data identifying the time instants (or time ranges) 404-407, the data identifying the users/sources 409-411 initiating the online transactions 413-416, and the data generated by the online business process 402 that performs or facilitates the transactions 413-416 (such as, for example, a transaction ID or transaction reference number for the online transaction, type of the transaction, amount or values related to the transaction, one or more SQL statements associated with the transaction, and so on). When recovery is needed in the context of the data storage illustrated in FIG. 4, the data recovery request sent to the backup system 106 may be: (i) on a given range of time (or a given time instant), (ii) by a specific user/source, and/or (iii) by a particular transaction or SQL statement.

In the context of a non-critical business process, FIGS. 5-9 illustrate examples of database table entries and corresponding data patterns that may comprise a set of pre-defined target patterns for training and monitoring by the PR module 108 as per particular embodiments of the present disclosure. The data entries received by the source database 104 may have data patterns similar to one or more of the pre-defined target patterns and may be stored in the database table(s) in the source database 104 as database table objects. The PR module 108 may collect database entries associated with a non-critical business process and stored in various tables in the original database 104, and derive the relationships among those data entries using pattern recognition based ML tools to create an analytical model that can identify pattern deviations discussed before, for example, with reference to block 313 in FIG. 3. More specifically, FIG. 5 is an exemplary table 500 showing a set of pre-defined target data patterns and corresponding data collection criteria for string parameters stored in the database tables in the source database 104 of FIG. 1 as per certain embodiments of the present disclosure. FIG. 6 is an exemplary table 600 showing a set of pre-defined target patterns and corresponding data collection criteria for the columns containing numbers in the database tables in the source database 104 of FIG. 1 as per some embodiments of the present disclosure. FIG. 7 is an exemplary table 700 showing a set of pre-defined target patterns and corresponding data collection criteria for the columns containing dates in the database tables in the source database 104 of FIG. 1 as per particular embodiments of the present disclosure. FIG. 8 is an exemplary table 800 showing a set of pre-defined target patterns and corresponding data collection criteria for the columns containing user or source information in the database tables in the source database 104 of FIG. 1 as per certain embodiments of the present disclosure. FIG. 9 is an exemplary table 900 showing a set of pre-defined target patterns and corresponding data collection criteria for the columns containing generic parameters in the database tables in the source database 104 of FIG. 1 as per some embodiments of the present disclosure.

Referring now to FIG. 5, for a non-critical process, various data patterns shown in column 502 in FIG. 5 may be derived for analysis by the PR module 108 based on the process-specific data entries received from the source database 104. For example, if the data pattern of a string parameter should have a pre-defined length range (as noted in column 502), an out-of-range value for this parameter received in the database 104 at arrow 112 in FIG. 1 or, equivalently, from the database 104 at block 307 in FIG. 3 (whether as a new data insert or a data update) may indicate a deviation at block 313 and trigger data collection by the PR module 108, as noted in the corresponding row in column 504. As another example, if the data pattern of a string parameter is pre-defined to be encrypted (as noted in column 502), the receipt of an unencrypted value may indicate a deviation at block 313, as noted in the corresponding row in column 504. Furthermore, if a string is expected to have a data pattern with a specific number of words therein (as noted in column 502), the receipt by the database 104 of a string with less or more number of words may indicate a deviation at block 313 and trigger data collection by the PR module 108, as noted in the corresponding row in column 504. Similar observations may be made for other exemplary patterns mentioned in FIG. 5. However, for the sake of brevity, each item shown in FIG. 5 is not discussed here.

Referring now to FIG. 6, for a non-critical process, if the data pattern of a number value should be in a specific pre-defined sequence (as noted in column 602), an out-of-sequence number received in the database 104 at arrow 112 in FIG. 1 or, equivalently, from the database 104 at block 307 in FIG. 3 (whether as a new data insert or a data update) may indicate a deviation at block 313 and trigger data collection by the PR module 108, as noted in the corresponding row in column 604. Similarly, if the data pattern of a number should have a pre-defined length range (as noted in column 602) like an 8-digit number or a 10-digit number, the receipt of a number that is outside of this range may indicate a deviation at block 313 and trigger data collection, as noted in the corresponding row in column 604.

Referring now to FIG. 7, when the data pattern of a date stored in the source database 104 for a transaction associated with a non-critical business process differs from one of the pre-defined target patterns listed in column 702, the PR module 108 may recognize the deviation and initiate data collection, as noted in column 704. For example, a deviation may arise if the date of a transaction is expected to be before a specific System Date (SysDate), but, in actuality, it has a data pattern or value that is after the SysDate. As another example, a deviation may arise if the date of a transaction is expected to be in a specific format, but the received data pattern (for example, at block 307 in FIG. 3) for the date does not follow the pre-defined format. Other exemplary patterns listed in the column 702 may be similarly explained.

Referring now to FIG. 8, for a non-critical process, if the data pattern of a source/user parameter should be limited to a pre-defined list of users such as, for example, authorized users or users already registered on a website (as noted in column 802), any new user information received in the database 104 at arrow 112 in FIG. 1 or, equivalently, from the database 104 at block 307 in FIG. 3 (whether as a new data insert or a data update) may indicate a deviation at block 313 and trigger data collection by the PR module 108, as noted in the corresponding row in column 804. As another example, if there is a list of data updates typically performed by a specific user, a deviation may arise if the user updates different data, as noted in column 804. Similarly, if a user or other source of a transaction typically updates transaction data during a specific time range or deletes transaction-related data only at a specific time, then any data updates or deletes received out of the corresponding pre-defined time or time range may trigger data collection by the PR module 108, as noted in the column 804. For the sake of brevity, however, other exemplary patterns listed in the column 802 are not discussed here.

Referring now to FIG. 9, the column 902 provides a list of some exemplary pre-defined target patterns for generic parameters and the column 904 provides corresponding deviations that may trigger data collections by the PR module 108. For example, if a non-critical process performs bulk data inserts or updates during a specific time range (as noted in column 902), then an insert or update received out of that time range may indicate a deviation triggering the data collection by the PR module 108. As another example, if a column in the database 104 typically has not received any data updates so far, then an update arriving for that column may indicate a deviation at block 313 in FIG. 3. Furthermore, if a Large Object (LOB) or Binary Large Object (BLOB) in a database column typically contains only images (such as, for example, product images, user profile images, and the like), a deviation may arise if data with text is received as the LOB value. If a generic parameter has a specific format, a value for that parameter that is out of the pre-defined format may indicate a deviation at block 313 in FIG. 3. Similarly, if the values of a generic parameter are never deleted or are deleted only during a pre-defined time range, then reception of a delete request or deletion out of the pre-defined time range, respectively, may trigger the deviation-based data collection by the PR module 108.

From the discussion of FIGS. 1-9, it is observed that, during the training phase (illustrated, for example, by block 309 in FIG. 3), the PR module 108 may collect all data stored in various tables in the database 104 associated with a non-critical business process and learn the relationships among various types of data and recognize their corresponding data patterns (such as, for example, those discussed with reference to FIGS. 5-9). A trained version of the PR module 108 may be created as a result of such training. In some embodiments, new data patterns—in addition to or different from those shown in FIGS. 5-9—may be added online by a user for business-specific, customized training of the PR module 108. In certain embodiments, during the training of the PR module 108, each column of the database 104 may be analyzed for one or more of the following criteria to enable the PR module 108 to understand the behavior of the data in the columns of various tables in the database 104: (i) uniqueness of the data, (ii) frequency of data repetition over a given time, (iii) the number of unique data in a given column, (iv) nature of the date column (>=<SysDate or after/same as/before SysDate, format of the date, and so on), (v) pattern in the number data type, if any (for example, a sequence, a number range, and so on), (vi) any organization-specific or business-specific information (for example, in case of an XYZ company, the "Product" column will have only XYZ company's products listed therein), (vii) if any encrypted data, and (viii) maximum and minimum data length.

The task of deriving insights into data behavior is indicated by blocks 310 and 312 in FIG. 3. As mentioned earlier, in one embodiment, the PR module 108 may use a neural network based SVM classifier to analyze the data to derive pattern-specific insights. Some examples of data patterns are provided in FIGS. 5-9. As discussed earlier with reference to FIG. 3, the historical data (provided to the recovery manager 102 for training the PR module 108) may be continually updated, for example, as new product orders are placed online, new customer accounts are created online, product returns are processed and refunds are issued, and so on. The training of the PR module 108, in turn, may be similarly updated to provide a robustly trained pattern recognition model. The training of various ML-based classifiers and analytical tools in the PR module 108 may generate a trained version of the PR module 108. As mentioned earlier, in particular embodiments, the trained version of the PR module 108 may be deployed to receive the data at block 307 and perform appropriate analyses to identify deviations, if any, at block 313. As an example, during the training phase, a neural network based classifier (such as the SVM classifier mentioned before) may be supervised to learn from the training data by presenting the training data at an input layer and dynamically adjusting the parameters of the neural network to achieve the desired output value for the input set using, for example, back-propagation of the error from the output of one stage to the input of the next stage, where weights are changed continuously until the output error falls below a preset value. In this manner, a neural network model may learn correlated patterns between input data sets and the corresponding target values. This enables the neural network model to predict an output when presented with a new, unseen input at run time.

Once the PR module 108 understands the behavior of the non-critical process related data in the database 104, when a new data entry is received by the PR module 108 for analysis, it would be able to identify if the new data falls in the same data behavior of the corresponding data column. If the new data entry does not have a data pattern earlier presented to the PR module 108 during the training phase, then a deviation event (indicated at block 313 in FIG. 3) occurs, triggering the PR module 108 to collect such suspect data for storage in the backup system 106, as discussed before (and also illustrated, for example, at block 305 in FIG. 3). As an example, if a column in the database 104 contains "ABC Product Descriptions" and if a data entry is received with "PQR Product Description", then the PR module 108 may mark the received data entry as a deviation and recognize it as the earlier-mentioned suspect data. Consequently, the PR module 108 may collect the deviating data entry and store it into the backup storage 106. If a user does not ask to revert this transaction within a pre-determined time (such as, for example, the earlier-mentioned one month), then the PR module 108 may add "PQR Product Description" in the list of allowed strings (similar to the exemplary strings shown in FIG. 5). From the next time, whenever a data entry is received containing the string "PQR Product Description," the PR module 108 may treat the data entry as "non-suspect" and may not initiate data collection. In some embodiments, pre- and post-operation data for the operation associated with the suspect data may be collected as well, as discussed before.

Figure 10:
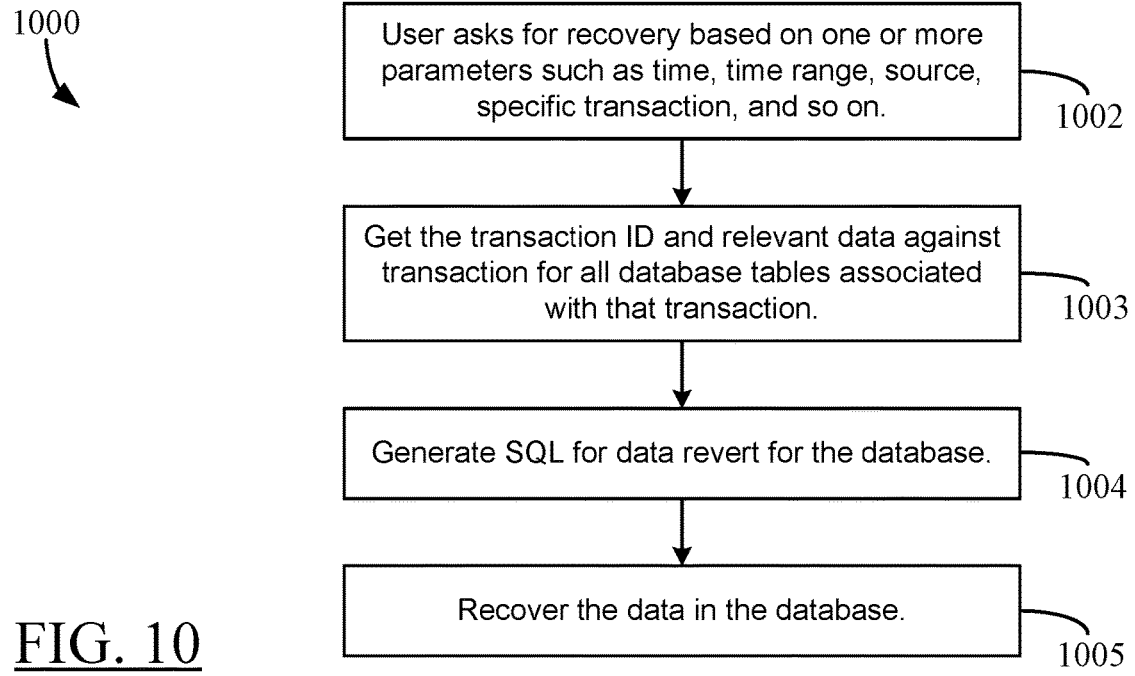
FIG. 10 is an exemplary block diagram illustrating how data may be recovered online by the recovery manager of FIG. 1 as per particular embodiments of the present disclosure.

FIG. 10 is an exemplary block diagram 1000 illustrating how data may be recovered online by the recovery manager 102 of FIG. 1 as per particular embodiments of the present disclosure. In the event of data corruption, wrong SQL operation or transaction, or incorrect data entry for a business process, the recovery manager 102 may obtain relevant data from the online backup storage 106 to restore the database 104. Initially, as noted at block 1002, a user may ask for online data recovery by providing one or more parameters to the recovery manager 102 to enable it to carry out the recovery. The parameters for data recovery may include, for example, the time of the erroneous transaction or data entry at issue, the data from a specific time range that needs to be considered for recovery, the source or originator of the transaction, information associated with or identifying a specific transaction (including, for example, information about any related SQL operation), and so on. Based on the recovery parameters received from the user at block 1002, the data recovery manager 102 may get from the online backup storage 106 the transaction ID and relevant data (based on the type of the process) against the transaction in question for all database tables (or database entries) associated with that transaction (block 1003). As noted before, in case of a critical business process, all pre- and post-operation data for the transaction at issue may be retrieved from the online backup system 106. However, in case of a non-critical (or regular) business process, typically only pre-operation data may be retrieved from the backup system 106 because of the selective and limited storage of backup data online for a regular process as per teachings of the present disclosure. Despite the limited storage of data for a non-critical process, the pattern recognition based selective storage may maintain the referential integrity for the stored data. Based on the retrieved data at block 1003, the recovery manager 102 may generate corresponding one or more SQL statements for data revert for the source database 104 (block 1004) and thereafter recover/restore the correct data in the database 104 (block 1005). In this manner, online data recovery may be performed without any loss of data for a critical business process. Furthermore, because of the manageable size of the online backup system 106 and pattern recognition-based selective data backup for a non-critical business process, the data may be retrieved reasonably promptly and with referential integrity from the online backup to restore the original database. Thus, the data recovery may be performed without downtime to give a truly online recovery experience.

Figure 11:
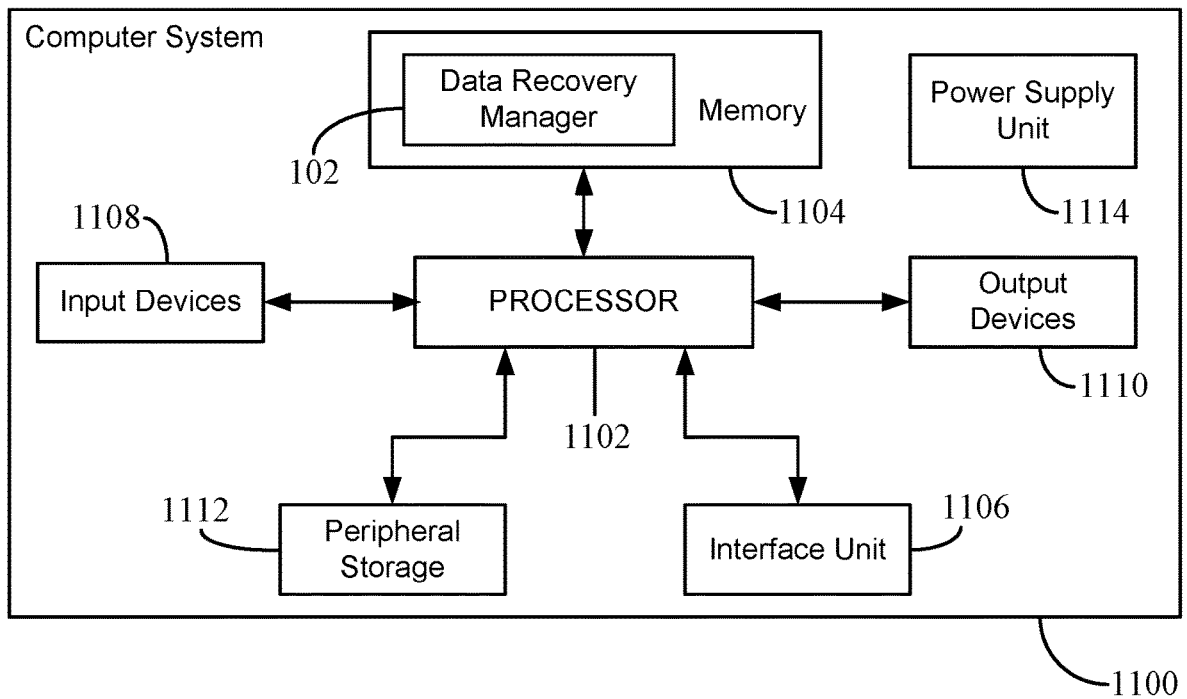
FIG. 11 illustrates an example configuration of a computer system that can be used to implement the online data recovery methodology described herein.

FIG. 11 illustrates an example configuration of a computer system 1100 that can be used to implement the online data recovery methodology described herein. In particular embodiments, the data recovery tool 102 may be used to implement the online data recovery methodology as per teachings of the present disclosure. The computer system (or computing device) 1100 may be suitably configured to implement the functionality of the recovery tool 102. The computer system 1100 may include one or more processors 1102, a memory unit 1104, an interface unit 1106 providing communication interfaces, one or more input devices 1108, one or more output devices 1110, and a peripheral storage unit 1112, connected to the processor 1102 as shown and configured to communicate with each other, such as via one or more system buses (not shown) or other suitable connection. In some embodiments, the computer system 1100 may be an information-handling system mentioned before.

In one embodiment, the input devices 1108 may provide user inputs—such as user inputs received at arrow 114 (FIG. 1) or block 302 (FIG. 3)—to the processor 1102 and the recovery manager 102 for further processing as per teachings of the present disclosure. The input devices 1108 may include, for example, a touchpad, a camera, a computer keyboard, a touch-screen, a joystick, a physical or virtual "clickable button" (such as, for example, on an online web page), a computer mouse/pointing device, and the like. A display screen is an example of the output device 1110. Other examples of an output device include a graphics/display device, a computer screen or monitor, an alarm system, or any other type of data output device. In some embodiments, the input device(s) 1108 and the output device (s) 1110 may be coupled to the processor 1102 via an I/O or peripheral interface(s). In some embodiments, the computer system 1100 may include more than one instance of the devices shown. In various embodiments, all of the components shown in FIG. 11 may be housed within a single housing. In other embodiments, the computer system 1100 may not include all of the components shown in FIG. 11. Furthermore, the computing device 1100 may be configured as a standalone system, as a server system, as a client system, or in any other suitable form factor.

The processor 1102 is a hardware device that may include a single processing unit or a number of processing units, all of which may include single or multiple computing units or multiple cores. When the computing device 1100 is a multiprocessor system, there may be more than one instance of the processor 1102 or there may be multiple processors coupled to the processor 1102 via their respective interfaces (not shown). The processor 1102 may include an integrated Graphics Processing Unit (GPU) or the GPU may be a separate processor device in the system 1100. The processor 1102 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 1102 may be configured to fetch and execute computer-readable instructions stored in the memory 1104, the peripheral storage 1112, or other computer-readable media. In some embodiments, the processor 1102 may be a System on Chip (SoC).

The memory 1104 and the peripheral storage unit 1112 are examples of non-transitory computer media (e.g., memory storage devices) for storing instructions that can be executed by the processor 1102 to perform the various functions described herein. For example, the memory unit 1104 may include both volatile memory and non-volatile memory (e.g., RAM, ROM, or the like) devices. Further, in particular embodiments, the peripheral storage unit 1112 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices constituting the peripheral storage 1112 may be collectively referred to as memory or computer storage media herein, and may be a media capable of storing computer-readable, processor-executable program instructions as computer program code that can be executed by the processor 1102 as a particular machine configured for carrying out the operations and functions described in the implementations herein.

The computing device 1100 may also include one or more communication interfaces as part of its interface unit 1106 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet, and the like. Communication interfaces in the interface unit 1106 can also provide communication with external storage (not shown), such as in a storage array, network attached storage, storage area network, one or more databases (such as the database 104 and the backup system 106 in FIG. 1, when implemented as external storages), or the like.

The computer storage media, such as the memory 1104 and the mass storage devices in the peripheral storage 1112, may be used to store software and data. For example, the computer storage media may be used to store the operating system (OS) for the computing device 1100, various device drivers for the device 1100, various inputs provided by the user during the implementation and operation of the recovery tool 102, and the data such as audio content, video content, text data, streaming content, historical data (related to block 309 in FIG. 3 or at arrow 116 in FIG. 1), various process-specific data (received at arrow 116 in FIG. 1 or at block 307 in FIG. 3) discussed with reference to FIGS. 1-9, or any other type of content. In some embodiments, the backup storage 106 (FIG. 1) may be a part of the peripheral storage 1112. In other embodiments, the backup storage 106 may be included as part of the system memory 1104. The computer storage media also may store software applications such as a word processing application, a spreadsheet application, the recovery manager 102, and the like. The program code for the software applications and the OS may be executed by the processor 1102.

In one embodiment, a non-transitory, computer-readable data storage medium, such as, for example, the system memory 1104 or the peripheral data storage unit 1112 may store program code or software for the data recovery manager 102 as per particular embodiments of the present disclosure. In the embodiment of FIG. 11, the system memory 1104 is shown to include such program code. In the embodiment of FIG. 11, the recovery manager 102 may operate in conjunction with the host OS (not shown) of the computing device 1100. The processor 1102 may be configured to execute the program code for the recovery manager 102, whereby the computer system 1100 may be operative to perform various tasks associated with the recovery manager 102 as per the teachings of the present disclosure. In one embodiment, such tasks may include, for example, the process steps illustrated in FIGS. 2-3 and 10 as well as other tasks discussed with reference to FIGS. 1 and 4-9 such as, for example, training of the PR module 108, reception of data for backup, evaluation of the received data based on process classification (critical vs. non-critical), detection of data pattern deviations, selective online backup of suspect data, and so on. The program code or software for the recovery tool 102 may be proprietary software or open source software which, upon execution by the processor 1102, may enable the computer system 1100 to perform operations related to online data recovery as per teachings of the present disclosure.

In particular embodiments, the computing device 1100 may include an on-board power supply unit 1114 to provide electrical power to various system components illustrated in FIG. 11. The power supply unit 1114 may receive batteries or may be connectable to an AC electrical power outlet. In one embodiment, the power supply unit 1114 may convert solar energy or other renewable energy into electrical power.

The example systems and devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the data recovery manager 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
receiving, by a computing system, a first indication that a first business process is a non-critical business process;
determining, by the computing system, that a first database entry for a first operation associated with the first business process deviates from a first pre-defined target pattern;
storing, by the computing system, the first database entry for a pre-determined time period, wherein the first database entry is initially stored in a database, and wherein the method further comprises:
receiving, by the computing system, historical data from the database associated with the first business process, wherein the historical data includes content related to a plurality of transactions associated with the first business process prior to the first operation;
training, by the computing system, a machine learning (ML) module with the content of the historical data to enable the ML module to recognize a set of pre-defined data patterns present in the content and relationships among the data patterns, wherein the set of pre-defined data patterns includes the pre-defined target pattern; and
generating, by the computing system, a trained version of the ML module based on the training thereof; and
discarding, by the computing system, the stored first database entry in the absence of a first recovery request for the first operation within the pre-determined time period.

2. The method of claim 1, wherein storing the first database entry comprises:
storing, by the computing system, the first database entry in a backup storage different from a database in which the first database entry was originally stored.

3. The method of claim 1, further comprising:
in the absence of the first recovery request, recognizing, by the computing system, a data pattern of the first database entry as equivalent to the first pre-defined target pattern; and
beyond the pre-determined time period, discontinuing, by the computing system, storage of those database entries associated with the first business process that contain data patterns similar to the data pattern of the first database entry.

4. The method of claim 1, wherein the first database entry includes one or more of the following:
date and time of the first operation;
an identification of a transaction associated with the first operation;
an identification of an originator of the transaction; and
data associated with the transaction.

5. The method of claim 1, wherein the determining comprises:
using, by the computing system, the trained version of the ML module to determine that the first database entry for the first operation deviates from the pre-defined target pattern.

6. The method of claim 1, wherein a second database entry for a second operation associated with the first business process is initially stored in a database, and wherein the method further comprises:
determining, by the computing system, that the second database entry deviates from a second pre-defined target pattern;
storing, by the computing system, the second database entry in a backup storage that is different from the database;
receiving, by the computing system, a second recovery request for the second operation within the pre-determined time period; and
performing, by the computing system, data recovery related to the second recovery request from the backup storage to the database based on data stored in the backup storage prior to the second operation.

7. The method of claim 6, further comprising:
identifying, by the computing system, a data pattern of the second database entry; and
continuing, by the computing system, to store in the backup storage and beyond the pre-determined time period those database entries associated with the first business process that contain data patterns similar to the data pattern of the second database entry.

8. The method of claim 6, wherein the first database entry and the second database entry are stored in a JavaScript Object Notation (JSON) format.

9. The method of claim 1, further comprising:
receiving, by the computing system, a second indication that a second business process is a critical business process; and
storing, by the computing system, a second database entry for a second operation associated with the second business process beyond the pre-determined time period regardless of whether the second database entry deviates from a second pre-defined target pattern.

10. A computing system comprising:
a memory storing program instructions; and
a processing unit coupled to the memory and operable to execute the program instructions, which, when executed by the processing unit, cause the computing system to:
receive a first indication that a first business process is a non-critical business process;
determine that a first database entry for a first operation associated with the first business process deviates from a first pre-defined target pattern;
store the first database entry for a pre-determined time period, wherein the first database entry is initially stored in a database, and wherein the program instructions, upon execution by the processing unit, cause the computing system to:
receive historical data from the database associated with the first business process, wherein the historical data includes content related to a plurality of transactions associated with the first business process prior to the first operation;
train a machine learning (ML) module with the content of the historical data to enable the ML module to recognize a set of pre-defined data patterns present in the content and relationships among the data patterns, wherein the set of pre-defined data patterns includes the pre-defined target pattern;
generate a trained version of the ML module; and
use the trained version of the ML module to determine that the first database entry for the first operation deviates from the pre-defined target pattern; and
discard the stored first database entry in the absence of a first recovery request for the first operation within the pre-determined time period.

11. The computing system of claim 10, wherein the program instructions, upon execution by the processing unit, cause the computing system to store the first database entry in a backup storage different from a database in which the first database entry was originally stored.

12. The computing system of claim 10, wherein a second database entry for a second operation associated with the first business process is initially stored in a database, and wherein the program instructions, upon execution by the processing unit, cause the computing system to:
determine that the second database entry deviates from a second pre-defined target pattern;
store the second database entry in a backup storage that is different from the database;
receive a second recovery request for the second operation within the pre-determined time period;
perform data recovery related to the second recovery request from the backup storage to the database based on data stored in the backup storage prior to the second operation;
identify a data pattern of the second database entry; and
continue to store in the backup storage and beyond the pre-determined time period those database entries associated with the first business process that contain data patterns similar to the data pattern of the second database entry.

13. The computing system of claim 10, wherein the program instructions, upon execution by the processing unit, cause the computing system to:
receive a second indication that a second business process is a critical business process; and
store a second database entry for a second operation associated with the second business process beyond the pre-determined time period regardless of whether the second database entry deviates from a second pre-defined target pattern.

14. The computing system of claim 13, wherein the program instructions, upon execution by the processing unit, cause the computing system to store the first database entry and the second database entry in a JavaScript Object Notation (JSON) format.

15. A computer program product comprising a non-transitory computer-usable medium having computer-readable program code embodied therein, the computer-readable program code adapted to be executed by a computing system to implement a method comprising:
receiving an indication that a first business process is a non-critical business process;
determining that a first database entry for a first operation associated with the first business process deviates from a first pre-defined target pattern;
storing the first database entry for a pre-determined time period;
receiving historical data from a database associated with the first business process, wherein the first database entry is initially stored in the database, and wherein the historical data includes content related to a plurality of transactions associated with the first business process prior to the first operation;
training a machine learning (ML) module with the content of the historical data to enable the ML module to recognize a set of pre-defined data patterns present in the content and relationships among the data patterns, wherein the set of pre-defined data patterns includes the pre-defined target pattern;
generating a trained version of the ML module based on the training thereof; and
using the trained version of the ML module to determine that the first database entry for the first operation deviates from the pre-defined target pattern; and
discarding the stored first database entry in the absence of a first recovery request for the first operation within the pre-determined time period.

16. The computer program product of claim 15, wherein the method further comprises:
in the absence of the first recovery request, recognizing a data pattern of the first database entry as equivalent to the first pre-defined target pattern; and
beyond the pre-determined time period, discontinuing storage of those database entries associated with the first business process that contain data patterns similar to the data pattern of the first database entry.

17. The computer program product of claim 15, wherein a second database entry for a second operation associated with the first business process is initially stored in a database, and wherein the method further comprises:
determining that the second database entry deviates from a second pre-defined target pattern;
storing the second database entry in a backup storage that is different from the database;

receiving a second recovery request for the second operation within the pre-determined time period; and performing data recovery related to the second recovery request from the backup storage to the database based on data stored in the backup storage prior to the second operation.

\* \* \* \* \*